(12) United States Patent
Burdakov et al.

(10) Patent No.: US 10,375,814 B2
(45) Date of Patent: Aug. 6, 2019

(54) PHOTON NEUTRALIZERS FOR NEUTRAL BEAM INJECTORS

(71) Applicant: TAE TECHNOLOGIES, INC., Foothill Ranch, CA (US)

(72) Inventors: Alexander V. Burdakov, Novosibirsk (RU); Alexandr A. Ivanov, Novosibirsk (RU); Sergey S. Popov, Novosibirsk (RU)

(73) Assignee: TAE TECHNOLOGIES, INC., Foothill Ranch, CA (US)

( * ) Notice: Subject to any disclaimer, the term of this patent is extended or adjusted under 35 U.S.C. 154(b) by 0 days.

(21) Appl. No.: 15/600,536

(22) Filed: May 19, 2017

(65) Prior Publication Data

US 2018/0007775 A1 Jan. 4, 2018

Related U.S. Application Data

(63) Continuation of application No. PCT/US2015/061356, filed on Nov. 18, 2015.

(51) Int. Cl.
*H05H 3/02* (2006.01)
*G21B 1/15* (2006.01)
*G21K 1/14* (2006.01)

(52) U.S. Cl.
CPC .......... *H05H 3/02* (2013.01); *G21B 1/15* (2013.01); *G21K 1/14* (2013.01); *Y02E 30/122* (2013.01); *Y02E 30/16* (2013.01)

(58) Field of Classification Search
CPC ... H05H 3/02; G21K 1/14; G21B 1/15; Y02E 30/16
See application file for complete search history.

(56) References Cited

U.S. PATENT DOCUMENTS

| | | | |
|---|---|---|---|
| 4,127,442 A | 11/1978 | Logan | |
| 4,140,576 A * | 2/1979 | Fink | H05H 1/22 250/251 |
| 4,260,455 A | 4/1981 | Moir | |

(Continued)

FOREIGN PATENT DOCUMENTS

WO WO 2014/039579 A2 3/2014

OTHER PUBLICATIONS

SG, 11201703890T Written Opinion, dated Apr. 4, 2018.
(Continued)

*Primary Examiner* — Wyatt A Stoffa
(74) *Attorney, Agent, or Firm* — One LLP

(57) ABSTRACT

A non-resonance photo-neutralizer for negative ion-based neutral beam injectors. The non-resonance photo-neutralizer utilizes a nonresonant photon accumulation, wherein the path of a photon becomes tangled and trapped in a certain space region, i.e., the photon trap. The trap is preferably formed by two smooth mirror surfaces facing each other with at least one of the mirrors being concave. In its simplest form, the trap is elliptical. A confinement region is a region near a family of normals, which are common to both mirror surfaces. The photons with a sufficiently small angle of deviation from the nearest common normal are confined. Depending on specific conditions, the shape of the mirror surface may be one of spherical, elliptical, cylindrical, or toroidal geometry, or a combination thereof.

6 Claims, 5 Drawing Sheets

(56) References Cited

U.S. PATENT DOCUMENTS

| | | | |
|---|---|---|---|
| 4,649,273 A | | 3/1987 | Chutjian |
| 4,654,183 A | | 3/1987 | Hershcovitch |
| 4,798,952 A | * | 1/1989 | Fink .................. H05H 1/22 250/251 |
| 4,960,990 A | * | 10/1990 | Lavan .................. G21K 1/14 250/251 |
| 5,814,819 A | | 9/1998 | Sinclair et al. |
| 5,818,040 A | * | 10/1998 | Kinoshita ............. H05H 3/02 250/251 |
| 7,807,963 B1 | | 10/2010 | Bier |
| 9,591,740 B2 | * | 3/2017 | Belchenko ........... H05H 3/02 |
| 2009/0140140 A1 | | 6/2009 | Raznikov et al. |

OTHER PUBLICATIONS

EP, 15860465.2 Supplementary Search Report, dated May 29, 2018.
RU, 2014146574 Office Action, dated Jul. 10, 2018.
WO, PCT/US2015/061356 ISR and Written Opinion, dated Jan. 28, 2016.
Branscomb, L. M., et al., "Experimental Cross Section for Photodetachment of Electrons from H$^-$ and D$^-$", 1955, Phys. Rev., vol. 98, No. 4, pp. 1028-1034.
Dimov, G.I., et al., "Conversion of a Beam of Negative Hydrogen Ions to Atomic Hydrogen in a Plasma Target at Energies Between 0.5 and 1 MeV", Nuclear Fusion, vol. 15, No. 3, pp. 551-553.
Fink, J.H., et al., "Photo Detachment of Electrons From Negative Ions in a 200-keV Neutral Deuterium-Beam Source", 1975, Lawrence Livermore Lab, California University, Livermore, USA, pp. 1-10.
Fink, J.H., et al., "A Study of Efficient High-Power, High-Energy Meutral Beams for the Reference Mirror Reactor", 1976, Lawrence Livermore Lab, California University, Livermore, USA, pp. 1-59.
Fink, J.H., "Photodetachment technology", 1984, AIP Conference Proceedings 111, pp. 547-560.
Hemsworth, R., et al., "Status of the ITER heating neutral beam system", 2009, Nuclear Fusion, vol. 49, No. 4, pp. 1-15.
"IPG High Power Scanner—2D for Intetgration With a Robot or Gantry" retrieved from http://www.ipgphotonics.com/Collateral/Documents/English-US/HP_Brochure.pdf on Jun. 21, 2017, 1 page.
Ivanov, A. A., et al., "Development of a negative ion-based neutral beam injector in Novosibirsk", Review of Scientific Instruments, 2014, vol. 85, pp. 02B102-1-02B102-5.
Kotelnikov, I. A., et al., "Photon neutralizer as an example of an open billiard", Physical Review E, 2013, vol. 87, pp. 01311-1-01311-8.
Kovari, M., et al., "Laser photodetachment neutraliser for negative ion beams", 2010, Fusion Engineering and Design, vol. 85, No. 5, pp. 745-751.
Krylov, A., et al., "Gas flow and related beam losses in the ITER neutral beam injector", 2006, Fusion Engineering and Design, vol. 81, No. 19, pp. 2239-2248.
Popev, SS., et al., "Non-Resonant Photon Accumulator for Neutralizing Powerful Negative Ion Beams", XXXVIII Intl. Conf. on Plasma Physics and Controlled Fusion Impact Factor, Feb. 14-18, 2011, 2 pages.
Vanek, V., et al., "Technology of a laser resonator for the photodetachment Neutralizer", 1984, AIP Conference Proceedings 111, pp. 568-584.

* cited by examiner

PHOTON NEUTRALIZERS FOR NEUTRAL BEAM INJECTORS

CROSS-REFERENCE TO RELATED APPLICATIONS

The subject application is a continuation of PCT Patent Application No. PCT/US15/61356, filed Nov. 18, 2015, which claims priority to Russian Patent Application No. 2014146574, filed on Nov. 19, 2014, both of which are incorporated by reference herein in their entirety for all purposes.

FIELD

The subject matter described herein relates generally to neutral beam injectors and, more particularly, to a photon neutralizer for a neutral beam injector based on negative ions.

BACKGROUND

A traditional approach to produce a neutral beam from a negative ion H−, D− beam for plasma heating or neutral beam assisted diagnostics, is to neutralize the negative ion beam in a gas or plasma target for detachment of the excess electrons. However, this approach has a significant limitation on efficiency. At present, for example, for designed heating injectors with a 1 MeV beam [R. Hemsworth et al., 2009, *Nucl. Fusion* 49 045006], the neutralization efficiency in the gas and plasma targets will be about 60% and 85%, respectively [G. I. Dimov et al., 1975, *Nucl. Fusion* 15, 551], which considerably affects the overall efficiency of the injectors. In addition, the application of such neutralizers is associated with complications, including the deterioration of vacuum conditions due to gas puffing and the appearance of positive ions in the atomic beam, which can be significant in some applications.

Photodetachment of an electron from high-energy negative ions is an attractive method of beam neutralization. Such method does not require a gas or plasma puffing into the neutralizer vessel, it does not produce positive ions, and it assists with beam cleaning of fractions of impurities due to negative ions. The photodetachment of an electron corresponds to the following process: $H^-+h\omega=H^0+e$. Similar to most negative ions, the H− ion has a single stable state. Nevertheless, photodetachment is possible from an excited state. The photodetachment cross section is well known [see, e.g., L. M. Branscomb et al., *Phys. Rev. Lett.* 98, 1028 (1955)]. The photodetachment cross section is large enough in a broad photon energy range which practically overlaps all visible and near IR spectrums.

Such photons cannot knock out an electron from H0 or all electrons from H− and produce positive ions. This approach was proposed in 1975 by J. H. Fink and A. M. Frank [J. H. Fink et al., *Photodetachment of electrons from negative ions in a 200 keV deuterium beam source, Lawrence Livermore Natl. Lab.* (1975), UCRL-16844]. Since that time a number of projects for photon neutralizers have been proposed. As a rule, the photon neutralizer projects have been based on an optic resonator similar to Fabri-Perot cells. Such an optic resonator needs mirrors with very high reflectance and a powerful light source with a thin line, and all of the optic elements need to be tuned very precisely. For example, in a scheme considered by Kovari [M. Kovari et al., *Fusion Engineering and Design* 85 (2010) 745-751], the reflectance of the mirrors is required to be not less than 99.96%, the total laser output power is required to be about 800 kW with output intensity of about 300 W/cm$^2$, and the laser bandwidth is required to be less than 100 Hz. It is unlikely that such parameters could be realized together.

Therefore, it is desirable to provide a non-resonance photo-neutralizer.

SUMMARY OF INVENTION

Embodiments provided herein are directed to systems and methods for a non-resonance photo-neutralizer for negative ion-based neutral beam injectors. The non-resonance photo-neutralizer described herein is based on the principle of nonresonant photon accumulation, wherein the path of the photon becomes tangled and trapped in a certain space region, i.e., the photon trap. The trap is preferably formed as two smooth mirror surfaces facing each other with at least one surface being concave. In the simplest form, the trap is preferably elliptical in shape. A confinement region of the trap is a region near a family of normals that are common to both mirror surfaces of the trap. The photons with a sufficiently small angle of deviation from the nearest common normal are confined. Depending on specific conditions, the shape of the trap may be one of spherical, elliptical, cylindrical, toroidal, or a combination thereof.

In operation, photon beams with a given angular spread along and across the trap are injected through one or more small holes in one or more of the mirrors. The photon beams can be from standard industrial power fiber lasers. The photo neutralizer does not require high quality laser radiation sources pumping a photon target, nor does it require very high precision adjustment and alignment of the optic elements Other systems, methods, features and advantages of the example embodiments will be or will become apparent to one with skill in the art upon examination of the following figures and detailed description.

BRIEF DESCRIPTION OF FIGURES

The details of the example embodiments, including structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

It should be noted that elements of similar structures or functions are generally represented by like reference numerals for illustrative purpose throughout the figures. It should also be noted that the figures are only intended to facilitate the description of the preferred embodiments.

DETAILED DESCRIPTION

Figure 1:
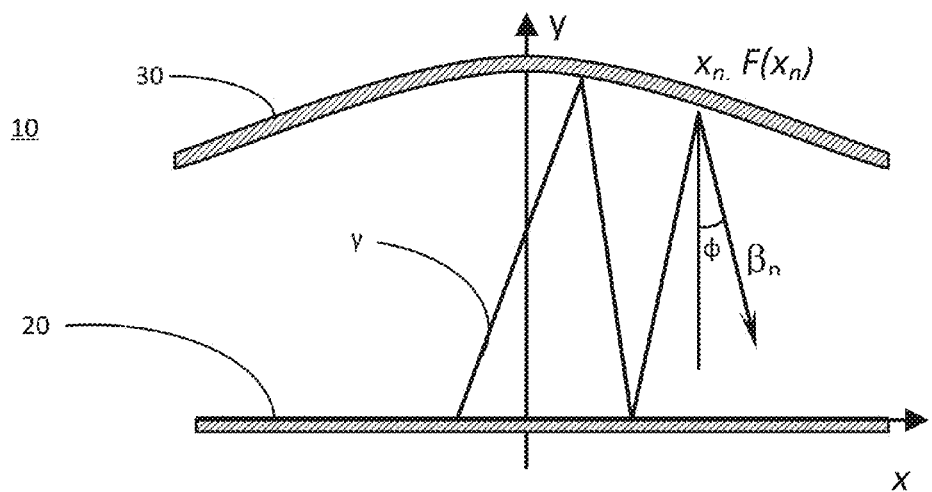
FIG. 1 is a schematic of a non-resonance photon trap.

Each of the additional features and teachings disclosed below can be utilized separately or in conjunction with other features and teachings to provide a non-resonance photo-neutralizer for negative ion-based neutral beam injectors. Representative examples of the embodiments described herein, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Embodiments provided herein are directed to a new non-resonance photo-neutralizer for negative ion-based neutral beam injectors. A detailed discussion of a negative ion-based neutral beam injector is provided in Russian Patent Application No. 2012137795 and PCT Application No. PCT/US2013/058093, which are incorporated herein by reference.

The non-resonance photo-neutralizer described herein is based on the principle of nonresonant photon accumulation, wherein the path of the photon becomes tangled and trapped in a certain space region, i.e., the photon trap. The trap is preferably formed as two smooth mirror surfaces facing each other with at least one surface being concave. In the simplest form, the trap is preferably elliptical in shape. A confinement region of the trap is a region near a family of normals that are common to both mirror surfaces of the trap. The photons with a sufficiently small angle of deviation from the nearest common normal are confined. Depending on specific conditions, the shape of the trap may be one of spherical, elliptical, cylindrical, toroidal, or a combination thereof.

In operation, photon beams with a given angular spread along and across the trap are injected through one or more small holes in one or more of the mirrors. The photon beams can be from standard industrial power fiber lasers. The photo neutralizer does not require high quality laser radiation sources pumping a photon target, nor does it require very high precision adjustment and alignment of the optic elements.

Turning to the figures, an embodiment of a non-resonance photon trap 10 is shown in FIG. 1. As depicted in a two-dimensional case, the trap 10 comprises a bottom flat mirror 20 and a top concave mirror 30. A photon γ with a small angle to vertical axes within the trap 10, will develop with each reflection from the upper mirror 30 some horizontal momentum difference to central axes of trap 10. The position of the photon γ after an n-th reflection is defined by the abscissa of a reflection point, $x_n$, with a height, $F(x_n)$, an angle φ from a vertical and a photon speed, $\beta_n$. The horizontal motion is described by the following system of equations:

$$x_{n+1} - x_n = (F(x_{n+1}) + F(x_n))tg\beta_n \quad (1)$$

$$\beta_{n+1} - \beta_n = 2\frac{dF(x_{n+1})}{dx} \quad (2)$$

For stability investigation, linearize versions of equations (1) and (2) are combined and the following equations are obtained:

$$x_{n+1} - x_n = 2F(0)\beta_n \quad (3)$$

$$\beta_{n+1} - \beta_n = 2\frac{d^2F(0)}{dx^2}x_{n+1} \quad (4)$$

By combining equations (3) and (4), the following linear recurrence relation is obtained:

$$x_{n+2} - 2x_{n+1} + x_n = 4F(0)\frac{d^2F(0)}{dx^2}x_{n+1} \quad (5)$$

$$= -4(0)\frac{x_{n+1}}{R},$$

where R is the curvature radius of top mirror 30. Equation (5) is a type of finite-difference scheme for an oscillation system with unit time step and with Eigen frequency $$\omega_0 = 2\sqrt{\frac{F(0)}{R}}.$$

The solution is representable in the form $x_n = A \cdot q^n$, where q is a complex number. Then for q defined as:

$$q_{1,2} = 1 - \frac{2F(0)}{R} \pm \sqrt{\left(1 - \frac{2F(0)}{R}\right)^2 - 1}, \quad (6)$$

The stability condition is |q|≤1, from which photons confinement in a geometric optic, when taking into account non-negativity of value $$\frac{F(0)}{R},$$

is determined as $$F(0)<R,\ \omega_0^2<4 \tag{7}$$

The curvature radius of the upper mirror 30 impacts photon confinement. Recurrent systems (1) and (2) allow the production of the integral of motion:

$$\sum_n tg\beta_n(\beta_{n+1}-\beta_n) = \sum_n \frac{2(x_{n+1}-x_n)}{F(x_{n+1})+F(x_n)}\frac{dF(x_{n+1})}{dx}, \tag{8}$$

In the case of a sufficiently small curvature of the upper mirror 30 and small steps, such as $$\Delta F \ll F,\ \frac{dF}{dx} \ll 1,\ \Delta\beta \ll 1, \tag{9}$$

the integral sums (8) is approximately transformed into $$\ln\frac{\cos\beta_0}{\cos\beta} = \ln\frac{F(x)}{F(x_0)}$$

or into standard adiabatic invariant $$F(x)\cos(\beta)=\text{const} \tag{10}$$

Relation (10) determines the region filled by photons.

Figure 2:
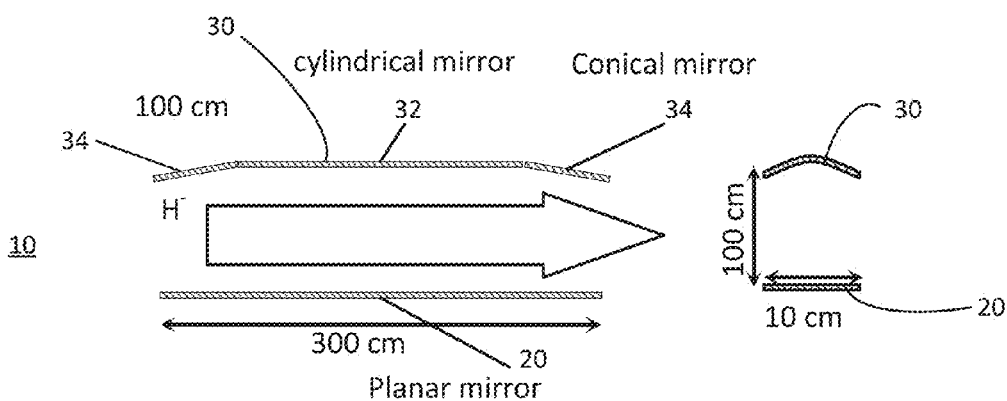
FIG. 2 is a schematic of a quasiplanar adiabatic optical trap.
Figure 3:
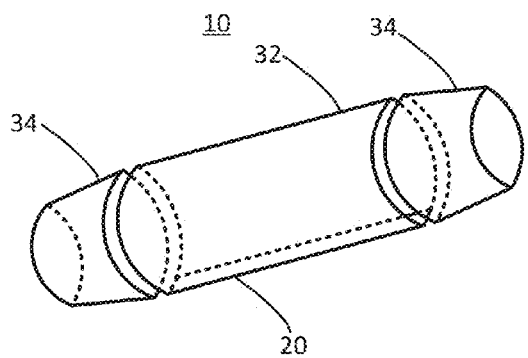
FIG. 3 is a perspective view schematic of the quasiplanar adiabatic optical trap shown in FIG. 2.

These estimations enable the design of an effective photon neutralizer for negative ion beams. Turning to FIGS. 2 and 3, a reasonable three-dimensional geometry of the trap 10 is a long arch assembly of four components. As depicted in FIG. 2, the trap 10 preferably comprises a bottom or lower mirror 20 at the bottom of the trap 10 that is planar or flat in shape, and an upper mirror assembly 30 comprising a central mirror 32 that is cylindrical in shape, and a pair of outer mirrors 34 that are conical in shape and coupled to the ends of the central mirror 32. As shown, an ion beam H⁻ is passed along the photon trap. The sizes are taken from the characteristic scales of a single neutralizer channel of a beam injector for the International Thermonuclear Experimental Reactor (ITER).

Figure 4:
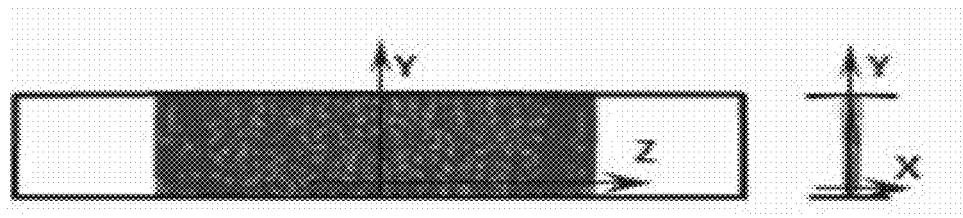
FIG. 4 is a trace of a single ray in the photon trap with a random angle from −3° to 5° in the XY plane, and −5° to 5° along the trap, the number of reflections is 4000. The cone angle of end mirrors is about 3°.

The following provides results of a numerical simulation of a photon neutralizer for ITER NBI. This simulation has been carried out by using ZEMAX code. FIG. 4 shows a one ray trace in the trap system 10 given in FIG. 2 with a random angle from −3° to 3° in the XY plane, and −5° to 5° along the trap 10.

The trajectory presented in FIG. 4 contains 4000 reflections, after which the ray remained in the trap system. In a resonance device [M Kovari, B. Crowley. *Fusion Eng. Des.* 2010, v. 85 p. 745-751], the storage efficiency under a mirror reflectance $r^2=0.9996$ is about $P/P_{in}\approx500$. In the case noted herein, with a lower mirror reflectance of $r^2=0.999$, the determined storage efficiency is $$\frac{P}{P_{in}} \approx \frac{1}{1-r^2} \approx 1000 \tag{11}$$

Losses will tend to be associated chiefly with a large number of surfaces inside the cavity and diffraction. [J. H. Fink, *Production and Neutralization of Negative Ions and Beams: 3rd Int. Symposium*, Brookhaven 1983, AIP, New York, 1984, pp. 547-560]

Figure 5:
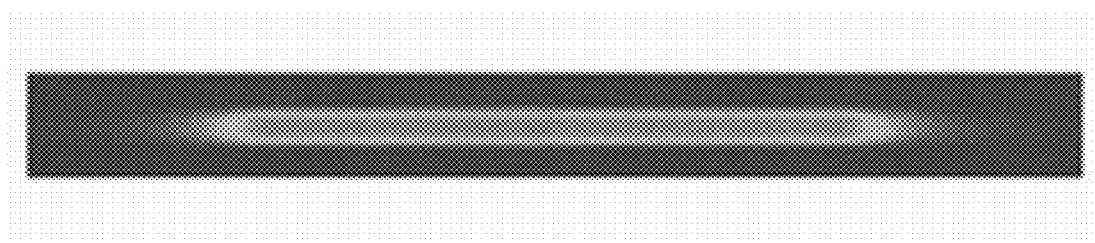
FIG. 5 illustrates an example of the surface intensity distribution and its cross profile in the middle of the trap.
Figure 5:
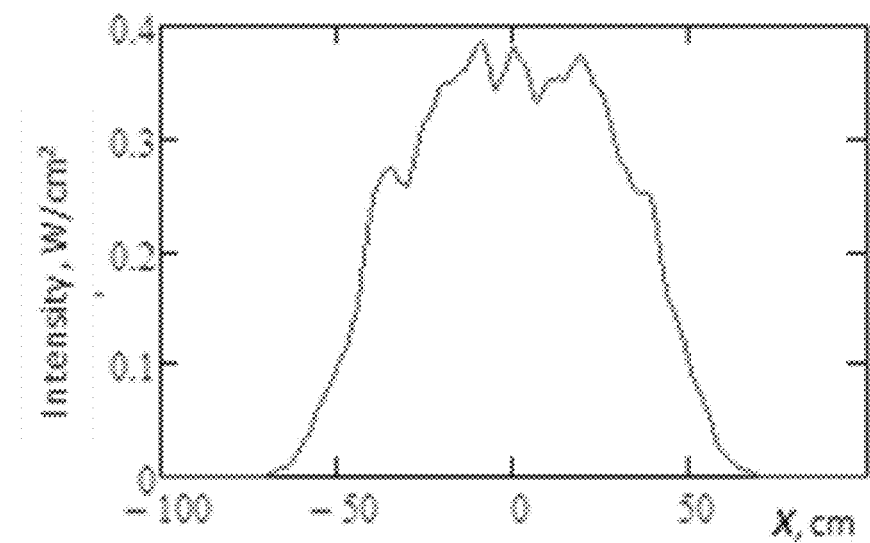

The distribution of the radiant energy flux through a horizontal plane inside the trap 10 is shown in FIG. 5, where the reflection coefficient of all surfaces is equal to 0.999 and the input radiant power is equal to 1 W. The calculated accumulated power in the cavity of the trap 10 is equal to 722 watts. Taking into account calculation losses (Zemax code monitors and evaluates such losses) the accumulated power value should be increased by 248 watts. Therefore, the storing efficiency reaches almost a maximum possible value (11). Thus, quasi-planar systems allow within the geometrical optics the creation of a confinement region with a given size.

Note, that the end cone mirrors 34 and main cylindrical mirrors 32 and 20 form broken surface as shown in FIGS. 2 and 3. The broken surfaces tend to have a negative effect on the longitudinal confinement of photons because this forms an instability region (see (7)). However, the number of crossings of these borders by a ray during the photon lifetime is not large in comparison with the total number of reflections, and, thus, the photon does not have time to significantly increase longitudinal angle and leave the trap through the ends of the trap 10.

Radiation Injection into Trap and Sources

To pump the optic cell, photons beams with a given angular spread along and across the trap 10 can be injected through one or more small holes in one or more mirrors. For example, it is possible by using a ytterbium fiber laser (γ=1070 nm, total power above 50 kW) [http://www.ipg-photonics.com/Collateral/Documents/English-US/HP_Brochure.pdf]. These serial lasers have sufficient power and their emission line is near optimal.

The radiation beam with necessary angular spread can be prepared from fiber laser radiation by special adiabatic conical or parabolic shapers. For example, radiation with a spread of 15° from fiber and Ø300µ may be transformed to 5° and Ø1 mm, which is sufficient for the neutralizer trap 10 described herein.

Efficiency of Photon Neutralization

Figure 6:
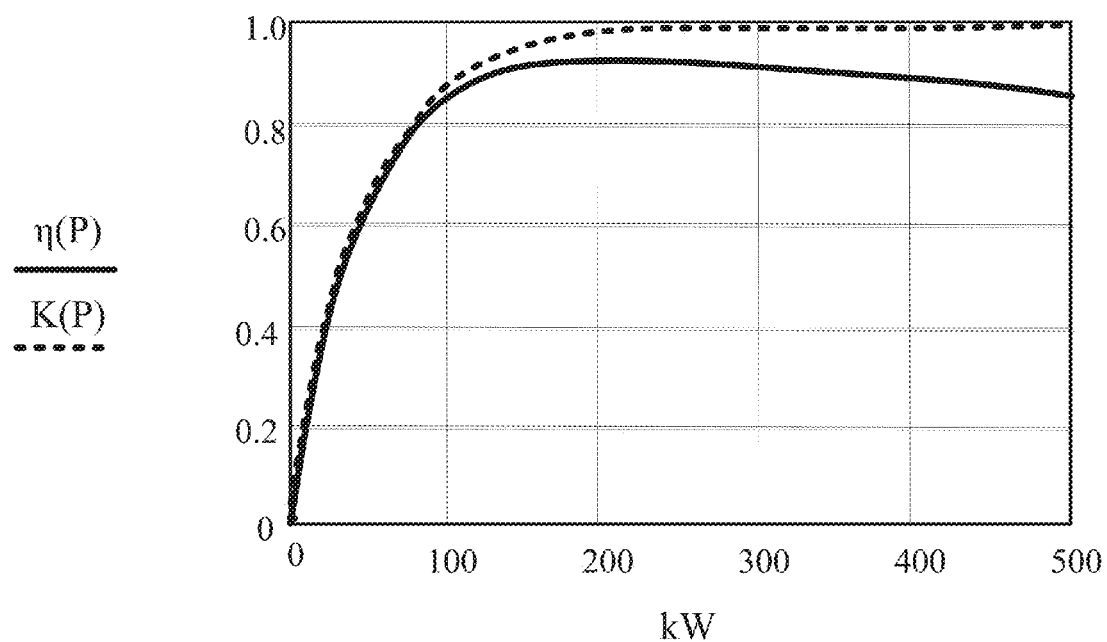
FIG. 6 is a chart showing the degree of neutralization (dotted line) and overall neutralizer efficiency (continuous curve) vs laser injection power.

The degree of neutralization is representable as $$K(P) = 1 - \exp\left(\frac{\sigma P}{E_0 dV}\right) \tag{12}$$

where d is the width of the neutralization region, $E_0$ is the photon energy, V is the velocity of the ions. P is the total accumulated power defined as $$P = \frac{P_0}{1-r^2},$$

where $P_0$ is the optic pumping power. The neutralization efficiency of D− flux by the laser with overall efficiency $\eta_l$ may be determined as $$\eta(P_0) = \frac{K(P)P_-}{P_- + \frac{P_0}{\eta_l}} \tag{13}$$

where P_ is the negative ion beam power. The efficiency increases with growth of D− beam power. The efficiency (13) and degree of neutralization (12) are shown in FIG. 6. This curve has been calculated for a single channel gas neutralizer in ITER injectors, in which 10 MW part is passed. Thus, in such an approach nearly 100% neutralization can be achieved with very high energetic efficiency of about 90%. For comparison, ITER neutral beam injector has a 58% neutralization [R. Hemsworth et al.// *Nucl. Fusion.* 2009, v. 49, 045006] and correspondently the same efficiency. The overall injector efficiency while taking into account accelerator supply and transport losses has been estimated by Krylov [A. Krylov, R. S. Hemsworth. *Fusion Eng. Des.* 2006, v.81, p. 2239-2248].

Figure 7:
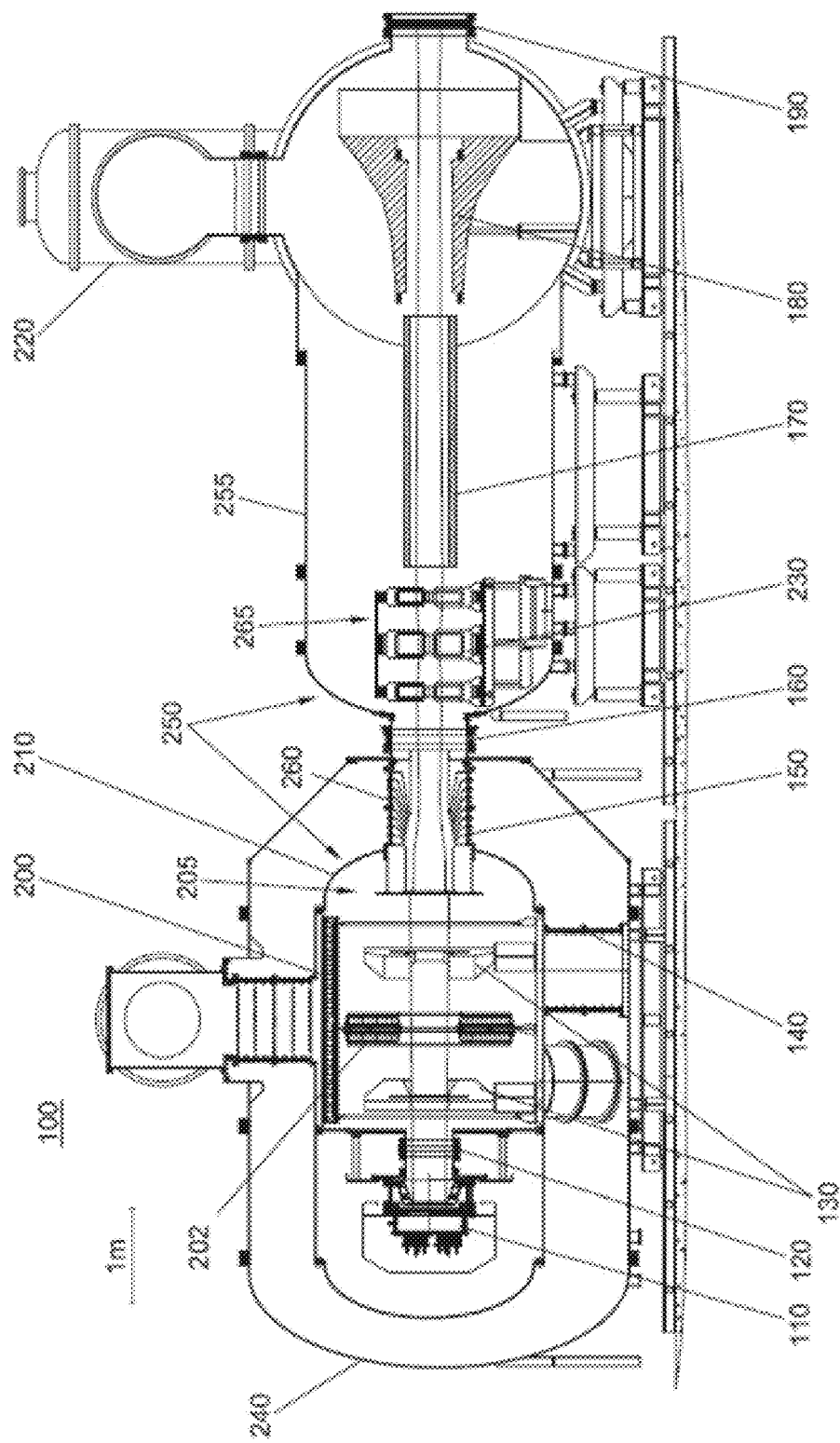
FIG. 7 is a plan view of a negative ion-based neutral beam injector layout.
Figure 8:
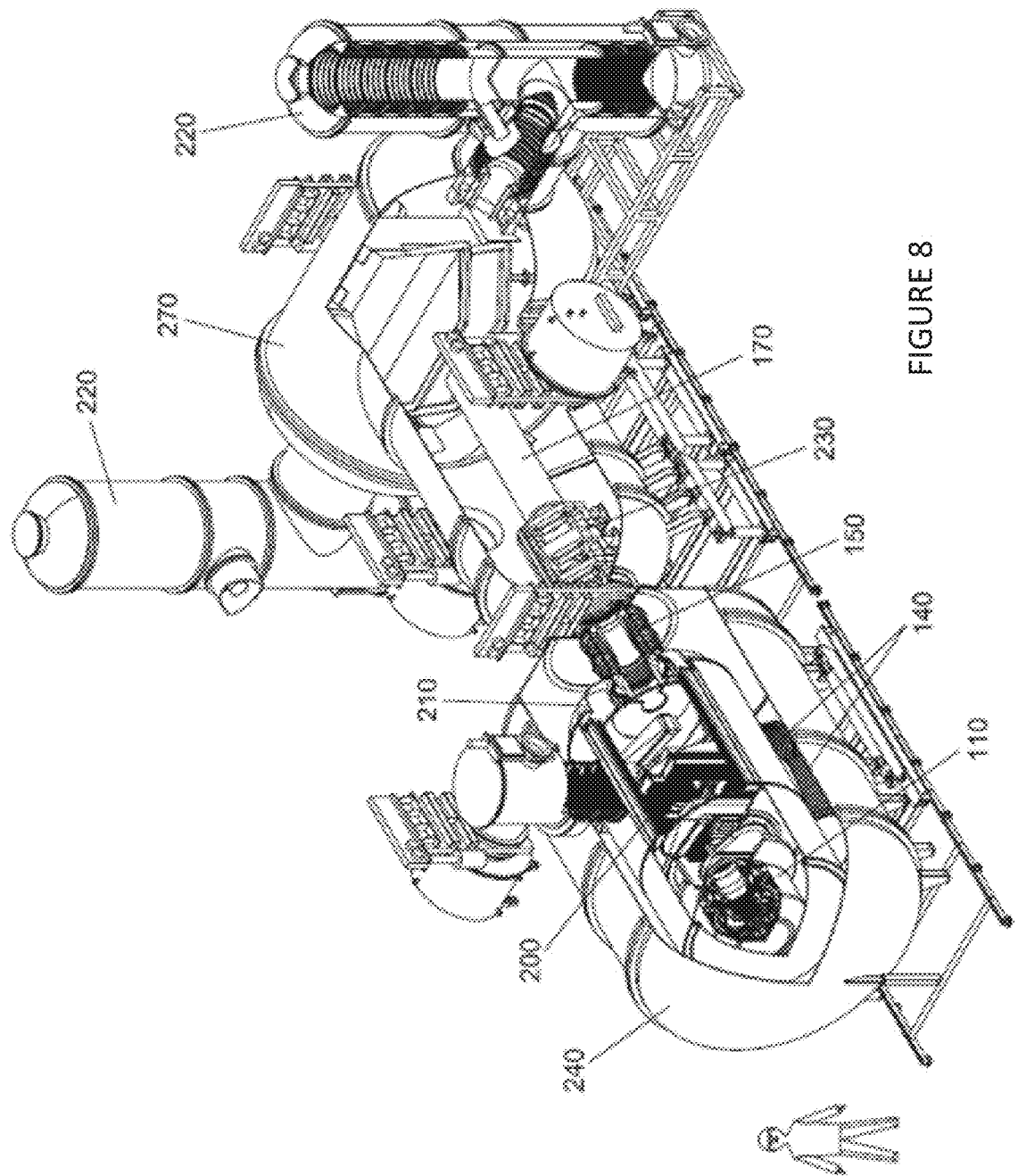
FIG. 8 is a sectional isometric view of the negative ion-based neutral beam injector shown in FIG. 7.

A preferred arrangement of an example embodiment of a negative ion-based neutral beam injector 100 is illustrated in FIGS. 7 and 8. As depicted, the injector 100 includes an ion source 110, a gate valve 120, deflecting magnets 130 for deflecting a low energy beam line, an insulator-support 140, a high energy accelerator 150, a gate valve 160, a neutralizer tube (shown schematically) 170, a separating magnet (shown schematically) 180, a gate valve 190, pumping panels 200 and 202, a vacuum tank 210 (which is part of a vacuum vessel 250 discussed below), cryosorption pumps 220, and a triplet of quadrupole lenses 230. The injector 100, as noted, comprises an ion source 110, an accelerator 150 and a neutralizer 170 to produce about a 5 MW neutral beam with energy of about 0.50 to 1.0 MeV. The ion source 110 is located inside the vacuum tank 210 and produces a 9 A negative ion beam. The vacuum tank 210 is biased to −880 kV which is relative to ground and installed on insulating supports 140 inside a larger diameter tank 240 filled with SF6 gas. The ions produced by the ion source are pre-accelerated to 120 keV before injection into the high-energy accelerator 150 by an electrostatic multi aperture grid pre-accelerator 111 in the ion source 110, which is used to extract ion beams from the plasma and accelerate to some fraction of the required beam energy. The 120 keV beam from the ion source 110 passes through a pair of deflecting magnets 130, which enable the beam to shift off axis before entering the high energy accelerator 150. The pumping panels 202 shown between the deflecting magnets 130 include a partition and cesium trap.

A more detailed discussion of the negative ion-based neutral beam injector is provided in Russian Patent Application No. 2012137795 and PCT application No. PCT/US2013/058093, which are incorporated herein by reference.

The example embodiments provided herein, however, are merely intended as illustrative examples and not to be limiting in any way.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A non-resonance photo-neutralizer for neutral beam injectors comprising
    first and second mirrors having opposing mirror surfaces forming a photon trap, wherein the mirror surface of the first mirror is concave and the mirror surface of the second mirror is flat, wherein the first mirror comprises a mirror assembly including a central mirror and first and second outer mirrors coupled to the central mirror.

2. The photo-neutralizer of claim 1 wherein the photon trap comprises a confinement region adjacent a family of normals common to the mirror surfaces of the first and second mirrors.

3. The photo-neutralizer of claim 1 wherein the central mirror is cylindrically shaped and the outer mirrors are conically shaped.

4. A negative ion based neutral beam injector comprising
    a negative ion source, and
    a non-resonance photo-neutralizer co-axially positioned with the negative ion source, wherein the photo-neutralizer including first and second mirrors having opposing mirror surfaces forming a photon trap, wherein the mirror surface of the first mirror is concave and the mirror surface of the second mirror is flat, wherein the first mirror comprises a mirror assembly including a central mirror and first and second outer mirrors coupled to the central mirror.

5. The neutral beam injector of claim 4 wherein the photon trap comprises a confinement region adjacent a family of normals common to the first and second mirror surfaces.

6. The neutral beam injector of claim 4 wherein the central mirror is cylindrically shaped and the outer mirrors are conically shaped.

* * * * *